TUNABLE BANDPASS FILTER

Filed May 8, 1964 2 Sheets-Sheet 1

INVENTORS
PHILIP S. CARTER
ARVIA L. PIERCE
BY
Paul B. Fihe
PATENT AGENT

TUNABLE BANDPASS FILTER

Filed May 8, 1964 2 Sheets-Sheet 2

INVENTORS
PHILIP S. CARTER
ARVIA L. PIERCE
BY
Paul B. Fihe
PATENT AGENT

United States Patent Office 3,368,169
Patented Feb. 6, 1968

3,368,169
TUNABLE BANDPASS FILTER

Philip S. Carter, Palo Alto, and Arvia L. Pierce, Fremont, Calif., assignors to Stanford Research Institute, Menlo Park, Calif., a non-profit corporation of California
Filed May 8, 1964, Ser. No. 365,990
5 Claims. (Cl. 333—73)

Figure 1:
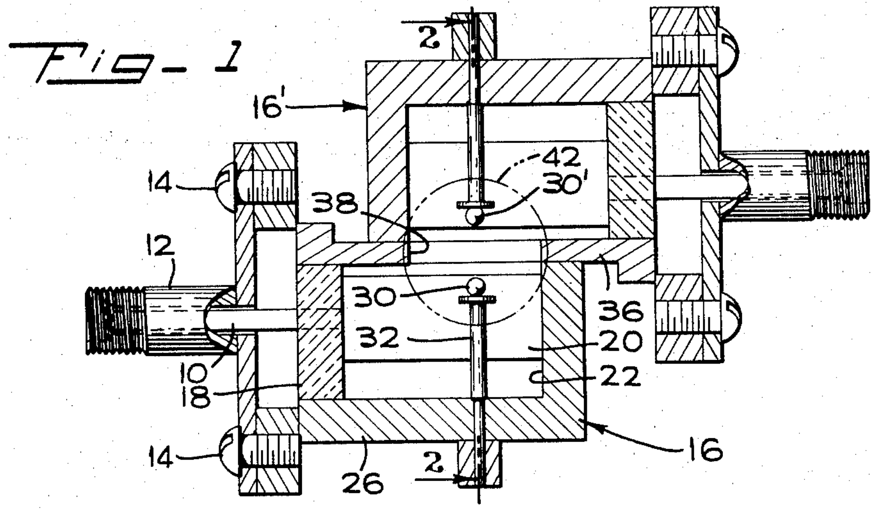

The present invention relates generally to electrical filters, and more particularly, to bandpass filters operable in the microwave frequency portion of the electro-magnetic energy spectrum and capable of being tuned over a rather broad frequency range.

It is desirable, quite obviously, for a bandpass filter operable in any frequency range to transmit energy at the desired frequencies with little or no attenuation while at the same time providing great attenuation of energy at other frequencies. Transmission of a desired narrow band of frequencies but rejection of all others is difficult to obtain in a passive network at microwave frequencies and the problem is greatly increased if tunability of the filter is desired over a relatively broad frequency range. In view of the fact that ferrimagnetic or ferrite mateials exhibit a clearly defined transmission characteristic when a predetermined magnetic field is applied thereto and the frequency at which transmission occurs changes with the applied direct current magnetic field, exploration of such materials for utilization in filters has been undertaken. However, optimum results have not been successfully achieved.

It is accordingly a general object of the present invention to provide a bandpass filter incorporating ferrites in an arrangement such that excellent tranmission of the microwave energy is achieved within the desired pass band white substantially no transmission occurs at other unwanted frequencies.

More particularly, it is a feature of the invention to provide a bandpass filter wherein substantially the only energy coupling is that achieved through the coupling of the magnetic fields of two or more ferrite resonators.

Specifically, it is a feature of the invention to provide a bandpass filter including two or more ferrite resonators, at least one of which is disposed in a region of high magnetic field of an input transmission line, and another is similarly disposed in a high magnetic region of an output line, the transmission lines being arranged so that substantially no direct coupling of the electro-magnetic fields is exhibited, but excellent coupling of the magnetic fields of the ferrites is provided.

In accordance with one aspect of the invention, only two ferrite resonators are employed, and their magnetic fields are coupled through a coupling aperture connecting two strip-transmission lines through either the side walls or top and bottom walls thereof.

In accordance with another specific aspect of the invention, one or more additional ferrite resonators are disposed within the coupling aperture itself to provide a coupling chain for the magnetic fields between adjacent resonators.

Additionally, in accordance with one specific aspect of the invention, variation of the shape or composition of one or more of the individual ferrite resonators is introduced to restrict coupling of the magnetic fields between adjacent resonators to those of the uniform precession mode.

Another feature of the invention is the provision of a bandpass filter utilizing ferrite resonators wherefore variation of an applied direct current magnetic field can effect tuning of the filter over a relatively broad range of frequencies.

A correlated feature of the invention is the physical arrangement of the ferrite resonators so that the power requirements for the tuning magnet are minimized.

Figure 2:
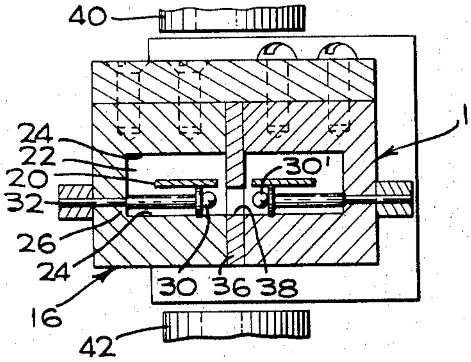
Figure 3:
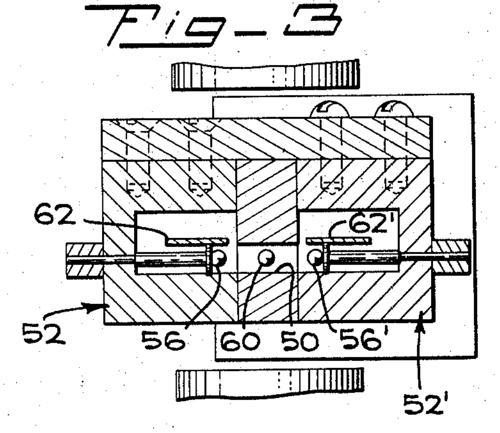
Figure 4:
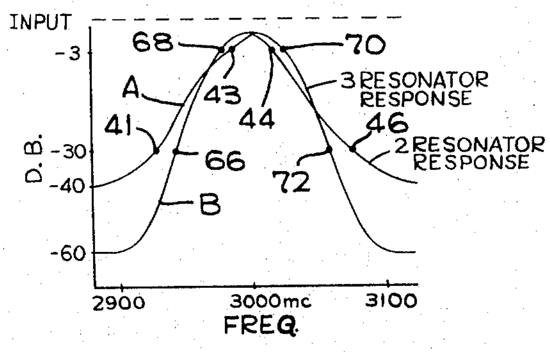
Figure 5:
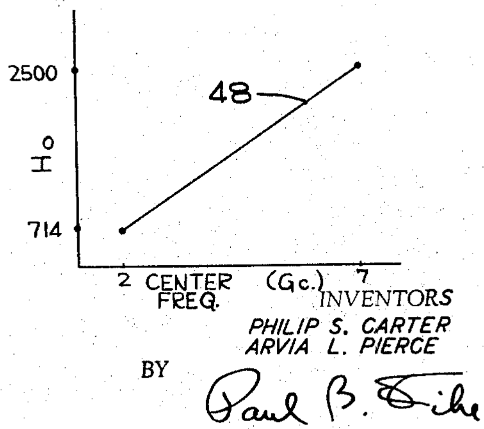
Figure 6:
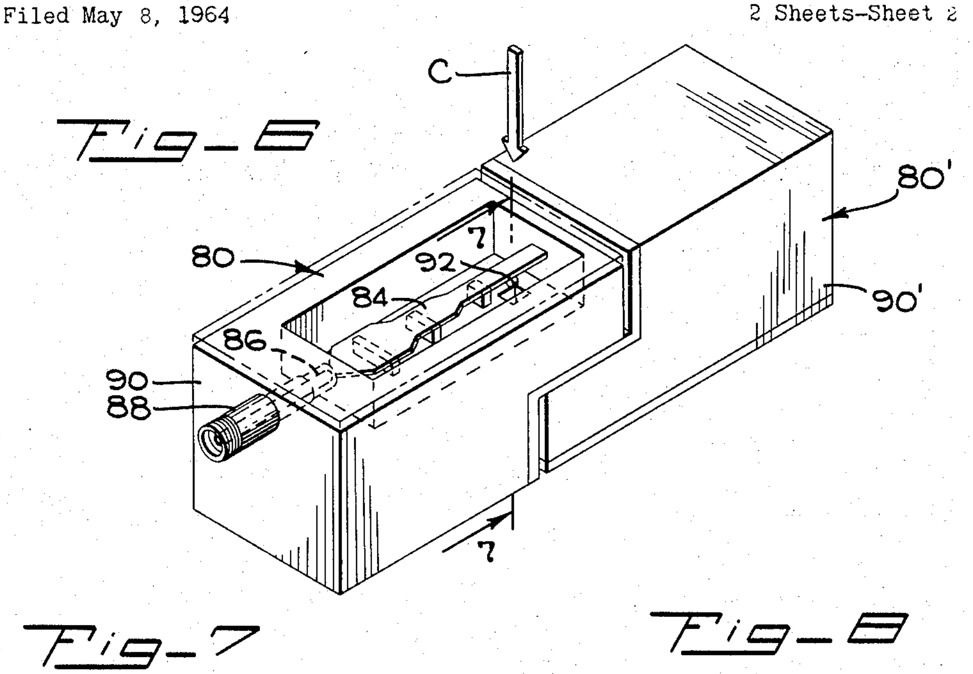
Figure 7:
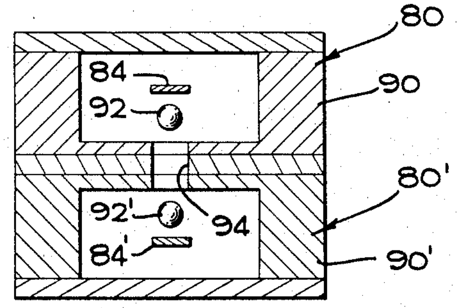
Figure 8:
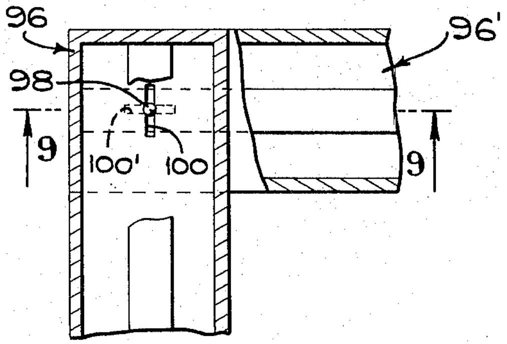
Figure 9:
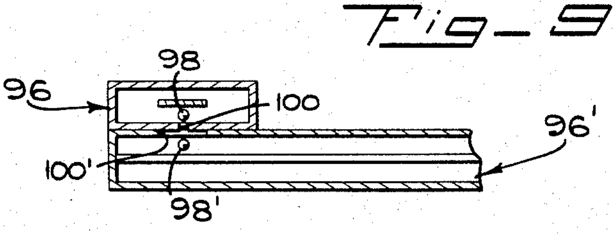

These as well as additional objects and features of the invention will become more apparent from a perusal of the following description of several embodiments of the invention as depicted in the accompanying drawings wherein:

FIG. 1 is a top plan view of a bandpass filter embodying the present invention in which two ferrite resonators are utilized, portions of the structure being broken away to illustrate interior details thereof, FIG. 2 is a transverse sectional view taken along line 2—2 of FIG. 1, FIG. 3 is a view similar to FIG. 2 but illustrating a modified embodiment of the invention wherein three ferrite resonators are utilized, FIG. 4 is a graphical representation of the attenuation characteristics of the two embodiments of the filter shown in FIGS. 1 and 2, and in FIG. 3, respectively, FIG. 5 is a graphical representation of the tuning characteristics of the embodiment of the invention disclosed in FIGS. 1 and 2, FIG. 6 is a perspective view of a third embodiment of the invention, portions thereof being broken away to illustrate interior details, FIG. 7 is a transverse sectional view taken along line 7—7 of FIG. 6, FIG. 8 is a fragmentary top plan view of yet another embodiment of the invention, portions thereof again being broken away to illustrate structural details, and FIG. 9 is a fragmentary transverse sectional view taken along line 9—9 of FIG. 8.

Generally, a bandpass filter embodying the present invention includes input and output portions arranged respectively for connection to input and output lines for the transmission of microwave energy. Ferrite resonator means are utilized to provide coupling between the input and output filter portions so that such coupling is restricted to a limited band of frequencies adjacent the resonant frequency of the ferrite resonator means as determined by the magnitude of an applied direct current magnetic field.

With particular reference to FIGS. 1 and 2, a bandpass filter arranged for connection to input and output coaxial transmission lines (not shown) is illustrated. A conventional coaxial connector, including a central conductor 10 and an outer cylindrical conductor 12 which latter is physically secured by suitable machine screws 14 to the open end of a hollow, generally rectangular body member 16 whose walls formed of copper or brass are thus electrically connected to the outer conductor 12 of the coaxial connector, enables the input of electrical power. The central conductor 10 is held in insulated and spaced relationship from the walls of the body member 16 by an annular dielectric spacer 18 and is physically connected to one end of a copper strip 20 which extends through the interior of the hollow body member 16 and is connected at its remote extremity to the end wall 22 thereof. Since such end wall 22 is physically joined to the top and bottom walls 24 and the side walls 26 of the body member which are, in turn, connected to the outer conductor 12 of the coaxial connector, the strip transmission line formed by the strip 20 and the body member 16 is short circuited. In accordance with known design techniques, the dimensions of the central strip 20 and the walls 24, 26 of the body member 16 are chosen to match the impedance of the input coaxial line (e.g. 50 ohms) and thus preclude reflections.

A ferrite resonator 30 in the form of a sphere of yttrium iron garnet is supported at the extremity of a dielectric mounting rod 32 between the center strip 20 and the bottom wall 24 of the body member and spaced from the end wall 22 thereof so as to lie in a region of high magnetic field when input microwave energy is delivered to the terminated strip transmission line from the aforementioned coaxial input line. Additionally, the ferrite sphere 30 is preferably adjacent one edge of the strip 20 which is, in turn, adjacent a lateral opening or aperture 34 in the one side wall 26 of the body member 16. The structure, as described, constitutes the input portion of this embodiment of the bandpass filter.

The output portion of the filter is of substantially identical construction and the elements thereof are accordingly indicated by like reference numerals with an added prime notation. In particular, the second ferrite sphere 30′ is identical in composition and dimensions to the first ferrite sphere 30 so that their resonant points are the same. Such output portion is similarly arranged for connection to an output coaxial line (not shown) and is mounted laterally adjacent the input portion of the filter so that the lateral openings 34, 34′ in the side walls 26, 26′ are in registry. A brass dividing wall or partition 36 is disposed between the input and output portions and itself contains a coupling aperture 38 in registry with the side wall apertures 34, 34′ of the input and output filter portions wherefore communication is established between the interior of the two body members 16, 16′. The dimensions and particularly the width of the coupling aperture 38 as determined by the thickness of the dividing wall 36 are chosen so that full coupling of the magnetic fields of the ferrite resonators 30, 30′ is achieved. For this result, the coupling aperture 38 is preferably rather narrow. On the other hand, minimum direct coupling of the electromagnetic fields between the input and output filter portions is desired, and for this purpose, the coupling aperture 38 is preferably relatively wide. Experimentation has determined that a coupling aperture having transverse dimensions of 0.400 by 0.100 inches and a thickness or width of 0.050 inches is substantially optimum for a bandpass filter having a center frequency in the range of 2 to 4 gigacycles.

To establish the resonant frequency of the ferrite spheres 30, 30′, the pole pieces 40, 42 of an electro-magnet are positioned above and below the filter portions so that both ferrite spheres are immersed in the same substantially homogeneous direct-current magnetic field. Since the body members 16, 16′ and the divding wall 36 are formed by copper or brass, they are substantially transparent to the magnetic field so applied.

If the applied field is of a magnitude so as to establish a resonant point of 3 gigacycles or 3,000 megacycles, excellent transmission of input radio frequency energy at this frequency will be achieved. More particularly, if energy at this frequency is delivered by the input coaxial line to the terminated strip transmission line constituting the filter input portion, an intense magnetic field will immerse the ferrite sphere 30 to establish a uniform precession and thus generate magnetic moments. The magnetic flux will penetrate through the coupling aperture 38 and be intercepted by the second ferrite resonator 30′ in the output portion of the filter, all in a well known fashion. In turn, the induced magnetic moments in the second ferrite resonator 30′ will establish appropriate electromagnetic fields in the output portion of the filter which will, in turn, be delivered to the output coaxial line.

At the resonant frequency of the ferrite resonators 30, 30′, substantially all of the input energy will be transmitted through the filter, or, in other words, but slight attenuation of the microwave energy will be experienced. More particularly, with reference to FIG. 4, the precise attenuation characteristics of the described bandpass filter are illustrated in the curve indicated at A. At the resonant frequency of 3,000 megacycles, the experienced loss of microwave energy through the filter is only approximately 1 decibel. A typical useful passband of the filter, which is arbitrarily defined as the range of frequencies over which microwave energy will be transmitted with a loss less than 3 decibels, has been experimentally determined to be approximately 25 megacycles, as indicated between points 40 and 42 on the curve. The stop band of the filter, which again is somewhat arbitrarily defined as the range of frequencies outside of which a loss of microwave energy greater than 30 decibels is experienced, has also been experimentally determined to be approximately 120 megacycles, as indicated between points 44 and 46 on the curve. It will also be observed by reference to the curve that a leveling of the attenuation occurs at about 40 decibels, which of course means that some energy is transmitted through the filter at all frequencies, although for most practical purposes, such energy transmission can be disregarded.

The bandpass characteristics of the filter shown in FIGS. 1 and 2 and illustrated graphically in FIG. 4 by the curve A will remain substantially the same throughout a rather broad tuning range. As previously mentioned, a difference in the applied direct-current magnetic field will shift the resonant frequency of the ferrite resonators 30, 30′ and it is therefore merely necessary to vary the magnitude of the direct current in the electro-magnet to effect tuning of the filter. The tuning characteristics of the filter are substantially linear as indicated by the curve 48 depicted in FIG. 5 representing the relationship of the center frequency to the applied direct-current magnetic field. As the field is varied approximately from 714 oersteds to 2500 oersteds, the center transmission frequency changes from 2 gigacycles to 7 gigacycles.

It is generally recognized that the multiplication of like bandpass filter elements improves the overall selectivity of any bandpass filter. In accord with this general principle, the selectivity of the described two resonator filters can be improved and, at the same time, the rejection of spurious, unwanted frequencies can be enhanced. This supplemental concept is embodied, by way of example, in the modified arrangement illustrated in FIG. 3.

As shown, the coupling aperture 50 is made wider to thus reduce the direct coupling of electro-magnetic fields between the input and output portions of the filter, generally indicated at 52 and 52′, and thus ultimately effect a decrease in the stop band of the filter. To circumvent the decreased coupling between the ferrite spheres 56, 56′ in the input and output portions of the filter resultant from the increased spacing therebetween, an additional identical ferrite sphere 60 is supported in a suitable fashion as by a dielectric rod (not shown) similar to that which supports the first and second ferrite spheres 30, 30′ in FIG. 1 substantially centrally within the coupling aperture 50 and substantially in the same plane as the first and second ferrite spheres 56, 56′ in the input and output portions 52, 54 of the filter. Preferably, the upper aperture walls are aligned with the strips 62, 62′ in the input and output portions of the filter so that the boundary conditions for the intermediate sphere 60 are like those of the other ferrite spheres 56 and 56′. Coupling of the magnetic fields between the first ferrite sphere 56 and the intermediate sphere 60 in the coupling aperture 50 occurs and, in turn, similar coupling between the intermediate sphere 60 and the second sphere 56′ in the output portion 52′ of the filter occurs. The arrangement may be considered as a coupled chain of ferrite resonators, each individual resonator being coupled substantially entirely only to the adjacent resonator. Whereas three ferrite resonators 56, 56′ and 60 are depicted in FIG. 3, it will be obvious that the chain may consist of four, five or more resonators if required to provide greater isolation between the input and output portion of the filter relative to the direct coupling of the electro-magnetic fields therebetween.

The improved characteristics of the FIG. 3 structure are also depicted in FIG. 4 by the second curve B wherein the arbitrary pass band of the structure, as indicated between points 66 and 68 on the curve, is approximately 30 megacycles and the stop band has a reduced bandwidth of but 90 megacycles as indicated between points 70 and 72. Furthermore, leveling of the curve B does not occur until a loss of approximately 60 decibels is achieved, so that for all practical purposes, no transmission of unwanted frequencies through the filter is experienced.

Both of the described embodiments of the present invention mount the ferrite resonators in a single plane and in rather close proximity. As a consequence, a single electromagnet can be utilized to establish the requisite direct-current magnetic field and furthermore, the pole pieces of such magnet can be relatively closely spaced wherefore the magnetic power lost in fringing fields is minimized. Thus, the power requirements for establishment and maintenance of the requisite magnetic field are reduced to a minimum.

Additionally, each of the described bandpass filters serves not only as a filter but also as a power limiter in view of the inherent characteristics of ferrite resonators. More particularly, it is well established that power generated in a ferrite resonator is proportional to the input electro-magnetic energy up to a certain value whereat saturation magnetization is achieved. Beyond this point, substantially no increase in the output power of a ferrite resonator is experienced with further increase in input microwave energy.

In either of the first two embodiments of the present invention, as described hereinabove, each individual ferrite sphere is identical to the other ferrite spheres, and the description thereof has been limited to the uniform precession of the magnetic moments about the axis determined by the applied direct-current magnetic field. This constitutes the fundamental gyromagnetic mode, commonly referred to as the uniform precession mode, and designated as the 110 mode, the resonant frequency of which is determined substantially by the applied direct-current magnetic field, or more particularly, is given by:

$$\omega=\gamma_0 H_0$$

where $\omega$ is the resonant frequency $\gamma_0$ is the gyromagnetic ratio, and $H_0$ is the value of the applied direct-current magnetic field.

However, other higher order modes, the so-called Walker modes, exist, the resonant frequency of which is determined both by the shape and composition of the ferrite material. For example, the resonant frequency of the 210 mode is given by:

$$\omega=\gamma_0(H_0-2M_s/15)$$

where $M_s$ is the saturation magnetization. Accordingly, it will be seen that an additional resonance for this mode would be experienced by each of the identical ferrite resonators and undesired transmission of energy at or near such other resonance frequency would be experienced.

A slightly modified embodiment of the invention will preclude the spurious response at such additional resonances. The shape of one of the ferrite resonators can be changed from spherical to ovoid or the spherical shape can be maintained, but a different ferrite material can be utilized. In the latter case, if one sphere is composed of yttrium iron garnet and the other sphere is composed of gallium-yttrium iron garnet, another commonly utilized ferrite material, the fundamental uniform precession resonant frequency will remain unchanged, but the resonant frequencies of the two spheres in the 210 mode will differ approximately 280 megacycles, a frequency difference much greater than the pass band of either of the previously described embodiments of the invention. Similar differences in the resonant frequencies of unlike ferrites will be experienced at other higher order modes, and the only effective transmission of the microwave energy will occur at the fundamental free precession frequency, as explained hereinabove.

Yet other embodiments of the invention can readily be visualized. The previously described structures can be considered as side-wall coupled bandpass filters. Coupling can also be arranged through the bottom and top walls, respectively, of similar strip-transmission lines, one such structure being illustrated in FIGS. 6 and 7. Such bandpass filter includes input and output portions 80, 80', each containing a strip 84 suitably connected to the center conductor 86 of a coaxial connector in a fashion similar to that described in connection with the first two embodiments of the invention. The outer conductor 88 of the coaxial connector is connected to the body 90 within which a hollow chamber or cavity is formed in appropriately spaced relation to the strip 84 disposed therewithin so that the desired impedance match with the coaxial line is established. If necessary, the strip 84 can be tapered in a step-like fashion, as illustrated, to achieve the proper impedance match and thus preclude reflections. The strip 84 is shorted to the body 90 at its extremity and a ferrite sphere 92 is positioned adjacent the terminated end of the strip transmission line in a region of high magnetic field. As best shown in FIG. 7, the ferrite sphere 92 in the input portion of the filter is positioned centrally under the strip 84 and above a coupling aperture 94, and the ferrite resonator 92' in the output portion 80' of the filter is, in turn, positioned above the strip 84' therewithin, and below that same coupling aperture 94. Thus, effective coupling of magnetic fields between two ferrite spheres 92, 92' is experienced at and near their resonant frequencies. However, the direct coupling of the electro-magnetic fields in the strip transmission lines is again minimized and excellent pass band characteristics result. Magnetic pole pieces (not shown) are positioned above and below the ferrite spheres 92, 92' to create the requisite direct-current magnetic field, as indicated by the arrow C, the physical arrangemtnt of the pole pieces being substantially identical to those illustrated in FIGS. 1, 2, and 3. The structure is adapted for the utilization of two ferrite resonators, as illustrated, or alternatively, can utilize intermediate ferrite resonators in the fashion generally described in connection with FIG. 3 to emphasize the transmission of energy at the desired pass band but effect greater rejection of unwanted frequencies.

Yet another embodiment of the invention is shown in FIGS. 8 and 9 which, although generally similar to the structure illustrated in FIGS. 6 and 7, provides increased rejection of unwanted frequencies through an alternate arrangement of the coupling aperture. More particularly, the input and output portions of the filter, generally indicated at 96 and 96', each of which constitutes a terminated strip-transmission line with a ferrite sphere 98 therein, are arranged at right angles so that a longitudinal slot 100 in the bottom wall of the input filter section 96 is disposed in rectangular relationship to a corresponding longitudinal slot 100' in the top wall of the output filter section 96'. This rectangular configuration of the transmission lines effects automatically a rectangular relationship of the magnetic components of the radio-frequency fields, as compared to the rectilinear arrangement illustrated in FIGS. 6 and 7, to reduce direct coupling thereof yet effects substantially no reduction in the coupling of magnetic fields between the ferrite spheres 98, 98'.

Yet other obvious modifications and/or alterations can be made in the described embodiments of the invention without departing from the spirit thereof, and the foregoing description of several embodiments is to be considered purely as exemplary and not in a limiting sense. The actual scope of the invention is to be indicated only by reference to the appended claims.

What is claimed is:

1. A bandpass filter which comprises an input strip-transmission line for electro-magnetic energy, a first ferrite resonator exposed to the electro-magnetic fields in said input strip-transmission line, means for immersing said first resonator in a direct-current magnetic field to establish a predetermined gyromagnetic resonant frequency therein, an output strip-transmission line adjacent said input strip-transmission line, a second ferrite resonator in said output strip-transmission line, means for immersing said second resonator in a direct-current magnetic field to establish substantially the same gyromagnetic resonant frequency therein, and means for coupling the magnetic fields of said resonators to effect transmission of energy from said input strip-transmission line to said output strip-transmission line in the frequency band including the resonant frequencies of said resonators, said coupling means including a coupling aperture whose longitudinal dimension is parallel to the longitudinal dimension of the adjacent strip transmission line so that substantially no direct coupling of the radio frequency fields exists.

2. A bandpass filter according to claim 1 wherein said coupling means includes a coupling aperture extending in a direction parallel to the planes of the strips of said strip-transmission lines.

3. A bandpass filter according to claim 1 wherein said coupling means includes a coupling aperture extending in a direction perpendicular to the planes of the strips of said strip-transmission lines.

4. A bandpass filter according to claim 3 wherein said strip-transmission lines extend at a right angle to one another.

5. A bandpass filter which comprises an input portion including a terminated strip transmission line adapted to receive radio-frequency energy and arranged so that radio-frequency fields are supported therein, an output portion including a terminated strip transmission line arranged to support radio-frequency fields and adapted to deliver radio-frequency energy therefrom, and means for coupling energy from said input portion to said output portion over a restricted pass band including ferrite resonator means exposed to said radio-frequency fields in a region of high magnetic field strength, said coupling means including a coupling aperture joining said input and output portions and having dimensions such that substantially no direct coupling of the radio-frequency fields exists, said coupling means also including a ferrite resonator disposed within said coupling aperture.

References Cited

UNITED STATES PATENTS

| | | | |
|---|---|---|---|
| 2,924,792 | 2/1960 | Gyorgy | 333—73 |
| 2,997,673 | 8/1961 | Whirry | 333—73 |
| 3,016,495 | 1/1962 | Tien | 333—56 |
| 3,022,466 | 2/1962 | Weiso | 330—56 |
| 3,058,070 | 10/1962 | Reimgold, et al. | 333—9 |
| 3,128,439 | 4/1964 | Brown, et al. | 333—24.2 |
| 3,200,353 | 8/1965 | Okwrt | 333—24.1 |
| 3,268,838 | 6/1966 | Matthaer | 333—73 |
| 3,290,625 | 12/1966 | Bartram | 333—73 |

OTHER REFERENCES

IRE International Convention Record 1960 (Carter) Part 3, pp. 130–135.

HERMAN KARL SAALBACH, *Primary Examiner.*

C. BARAFF, *Assistant Examiner.*